(12) United States Patent
Fan

(10) Patent No.: US 8,721,259 B2
(45) Date of Patent: May 13, 2014

(54) PLANET WIND SAIL MECHANISM

(76) Inventor: Nai-Wen Fan, New Taipei (TW)

(*) Notice: Subject to any disclaimer, the term of this patent is extended or adjusted under 35 U.S.C. 154(b) by 637 days.

(21) Appl. No.: 13/034,797

(22) Filed: Feb. 25, 2011

(65) Prior Publication Data

US 2011/0209650 A1 Sep. 1, 2011

(30) Foreign Application Priority Data

Feb. 26, 2010 (TW) ................................ 99203506 U

(51) Int. Cl.
*F03D 3/02* (2006.01)
(52) U.S. Cl.
USPC ............ 415/4.4; 415/907; 416/51; 416/132 B
(58) Field of Classification Search
USPC ............. 415/2.1, 4, 4.2, 4.4, 907; 416/44, 51, 416/118, 119, 132 B
See application file for complete search history.

(56) References Cited

U.S. PATENT DOCUMENTS

| | | | | |
|---|---|---|---|---|
| 4,609,827 A | * | 9/1986 | Nepple | 290/44 |
| 5,380,149 A | * | 1/1995 | Valsamidis | 415/2.1 |
| 8,142,154 B2 | * | 3/2012 | Gartner | 416/81 |
| 2005/0079054 A1 | * | 4/2005 | Kurita | 416/132 B |
| 2008/0019833 A1 | * | 1/2008 | Martin | 416/132 B |

* cited by examiner

*Primary Examiner* — Nathaniel Wiehe
*Assistant Examiner* — Woody A Lee, Jr.
(74) *Attorney, Agent, or Firm* — Chun-Ming Shih

(57) ABSTRACT

A planet wind sail mechanism includes a main axis, a first driving unit, and a wind sail body. The first driving further includes a rotation frame with a plurality of ribs, a transmission gear attached on the rib, a fixed gear which is disposed on the main axis and engaged with the transmission gear and a rotary gear is disposed on the edge of the rotation frame and engaged with the transmission gear. The wind sail body includes one rotation axis and the rotation axis is disposed on the edge of the rotation frame. When the wind sail body revolves along the main axis, both the rotary gear and the wind sail body also rotate itself. And the fixed gear rotates in an opposite direction with the rotary gear.

13 Claims, 16 Drawing Sheets wind direction wind direction

US 8,721,259 B2

PLANET WIND SAIL MECHANISM

This application claims the benefit of the filing date of Taiwan Patent Application No. 099203506, filed on Feb. 26, 2010, in the Taiwan Intellectual Property Office, the disclosure of which is incorporated herein in its entirety by reference.

BACKGROUND OF THE INVENTION

1. Field of Invention

The present invention relates to a mechanism and more particularly to a planet wind sail mechanism with a main axis, a driving unit and a wind sail body.

2. Related Art

There are two types of used wind sail structure, one is the horizontal axis and the other one is the vertical axis. The most differences are the shape of the wind sail and the way of the rotation.

The axis of the horizontal axis wind sail is parallel to the direction of the fluid. The horizontal axis wind sail connects all sails in a common axle center and requires higher strength of the sail structure. This structure also limits its application only for some special condition.

The axis of the vertical axis wind sail is vertical to the direction of the fluid and is parallel to the sail. It could extend the sail but not require higher strength; it also could be used in more common application. But if the sail of the vertical axis wind sail is fixed, it may endure the same wind power on the both sides of the sail and cause the sail not to rotate. If the sail is a switch type, it could turn off one side of the sail to avoid the above condition. But if the direction of wind changes, the switch type sail may decrease the efficient.

The improvement of the wind sail structure is the main goal of this invention.

SUMMARY OF THE INVENTION

A planet wind sail mechanism includes a main axis, a first driving unit, and a wind sail body. The first driving further includes a rotation frame with a plurality of ribs, a transmission gear attached on the rib, a fixed gear which is disposed on the main axis and engaged with the transmission gear and a rotary gear is disposed on the edge of the rotation frame and engaged with the transmission gear. The wind sail body includes one rotation axis and the rotation axis is disposed on the edge of the rotation frame. When the wind sail body revolves along the main axis, both the rotary gear and the wind sail body also rotate itself. And the fixed gear rotates in an opposite direction with the rotary gear.

DETAIL DESCRIPTION OF THE INVENTION

In the present disclosure, the term gear is not limited to typical gear. The gear can represent any one of the following: fixed gear, bevel gear on drive shaft, gear on spin shaft, cylindrical gear, straight gear, spur gear, bevel gear; crown gear, disc gear, gear rack, friction disc wheel, friction disc, universal joints, worm wheel, worm, roller chain, belt, timing belt, toothed belt, notched belt, pulley.

Figure 1A:
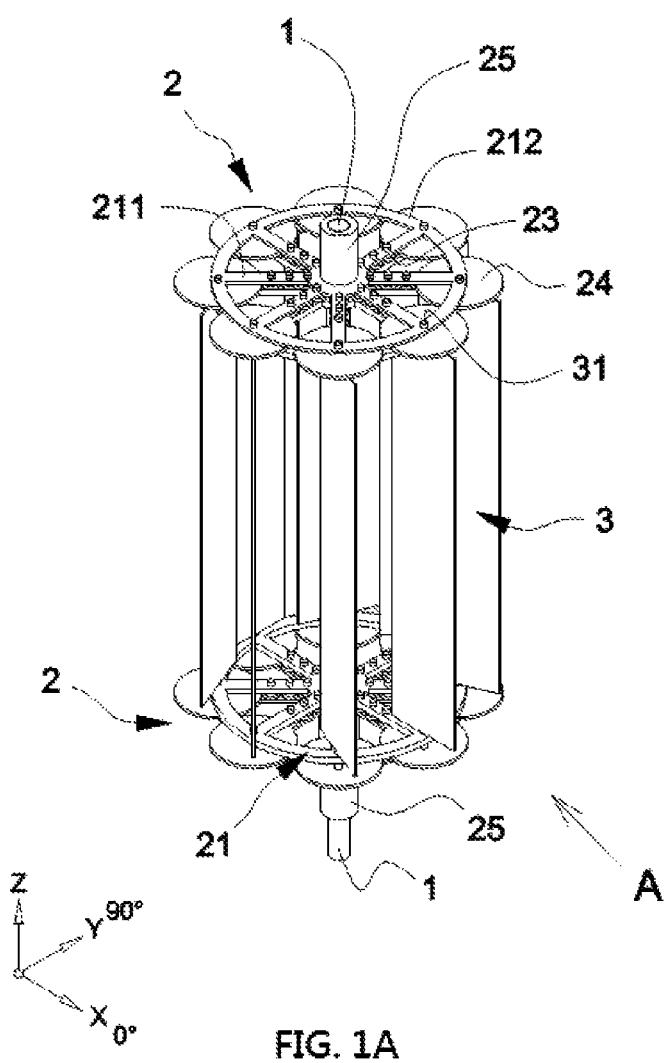
FIG. 1A-C illustrate one embodiment of the present disclosure.

Referring to FIG. 1A, the first embodiment of current disclosure. A planet wind sail mechanism A including a bearing 25, a main axis 1, a first driving unit 2 and a wind sail body 3. The first driving unit 2 could be plural and disposed on any position of the main axis 1. The first driving unit 2 is disposed on one or both ends of the main axis 1.

Figure 1B:
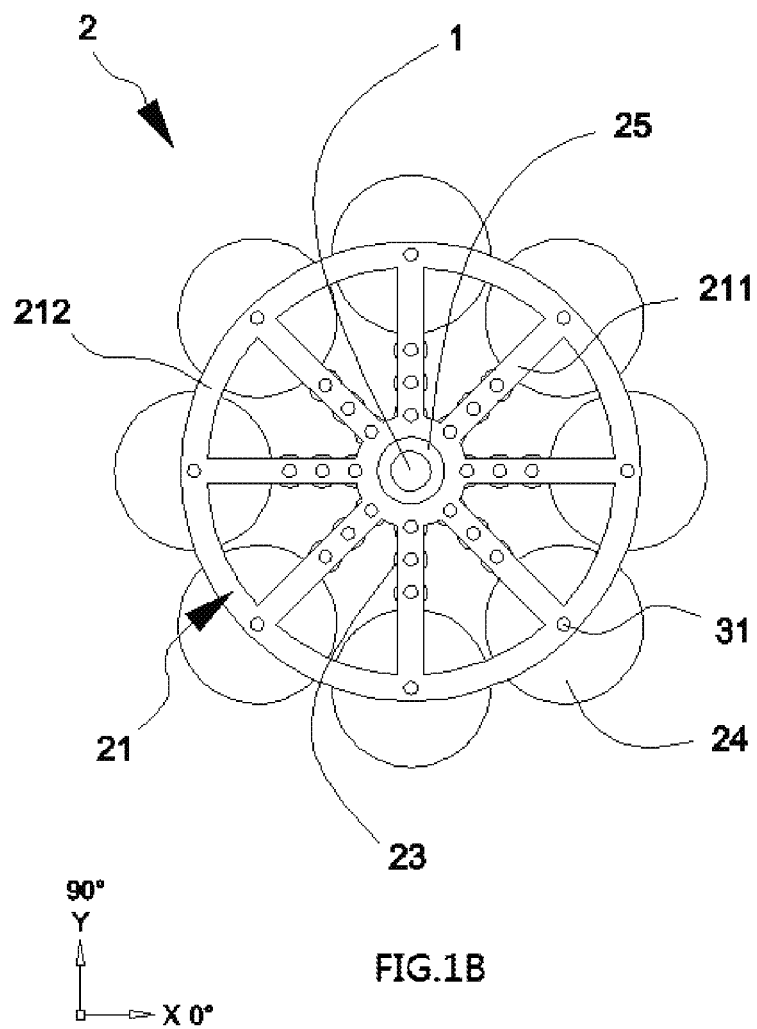
Figure 1C:
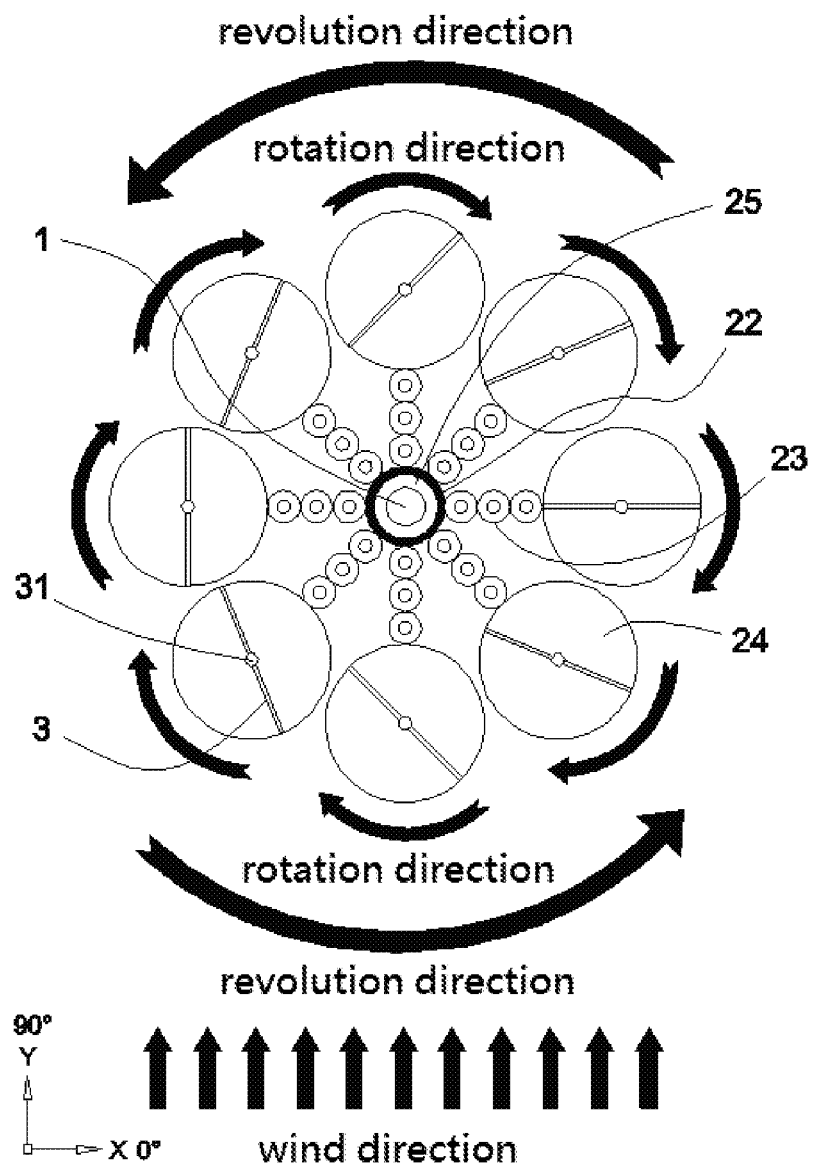

Referring to FIG. 1B and FIG. 1C, the top view and action sketch of the first embodiment of this disclosure. The first driving unit 2 including a rotation frame 21, a transmitting gear 23, a fixed gear 22 and a rotary gear 24. The rotation frame 21 is fixed on the main axis 1 and the transmitting gear 23 is disposed on ribs 211 of the rotation frame 21 movably. The fixed gear 22 is fixed on the bearing 25 and disposed on one side of the rotation frame 21 engaging to the transmitting gear 23, the fixed gear 22 and the bearing 25 could be formed integrally. The rotary gear 24 is disposed on a side edge 212 of the rotation frame 21 movably and engaging to the transmitting gear 23. The ratio of circumference between the fixed gear 22 and the rotary gear 24 is 1:2. The quantity of transmitting gear 23 is odd number in this embodiment. A rotation axis 31 is disposed on at least one end of the wind sail body 3 and on the side edge 212 of the rotation frame 21 movably, and the rotation axis 31 is fixed on the axle center of the rotary gear 24. The transmission between the fixed gear 22, the transmitting gear 23 and the rotary gear 24 is linking-up, the rotation axis 31 is disposed on both ends of the wind sail body 3, the rotation axis 31 threads the side edge 212 of the rotation frame 21 and is fixed on the axle center of the rotary gear 24. The rotation angle of the wind sail body 3 is preset and with different initial value. The revolution direction of the wind sail body 3 circling the bearing 25 is opposite to the rotation direction of the wind sail body 3 itself.

Referring to FIG. 1C, the action of the first embodiment of this disclosure, it is revolution that the wind sail body whirls circularly around the bearing 25 and it is rotation that the wind body 3 whirls itself.

The direction of revolution and rotation is opposite, the revolution is expressed by revolution angle and the rotation is expressed by rotation angle. The angle is expressed by angular coordinate on X-Y plane with the zero point that is the axle center of the main axis 1 or the rotation axis of the wind sail body 3. The area enduring the wind force is the cross area that the sail surface projects to the horizontal direction of the wind by each rotation angle. It is only for convenient description that the planet wind sail mechanism taking the axle center of the main axis 1 as zero point and cut by ±X-axis line and ±Y-axis line, it is not the restriction for the direction and position of the planet wind sail mechanism of this embodiment of this disclosure. Referring to FIG. 1C, the type of sail surface of the wind sail body 3 could be plane, single-curved or double-curved surface. It is obvious that the preset initial rotation angle of each wind sail body 3 is different on the X-Y plane. We use the axle center of the main axis 1 as zero point and the connection line from 0 degree to 180 degree of revolution angle as ±X-axis line, then cut the first driving unit 2 horizontally and separate the wind sail body 3 into upper and lower parts. The slope condition is opposite between upper and lower parts of the wind sail body 3.

The wind sail body 3 with preset initial zero rotation degree is set on the position with zero revolution degree, the sail surface of the wind sail body 3 is parallel to the ±X-axis line and vertical to the direction of the wind. The wind sail body 3 reaches the most area enduring the power of the wind and received the most effect of the power of the wind.

The wind sail body 3 with preset initial 90 rotation degree is set on the position with 180 revolution degree, the sail surface of the wind sail body 3 is vertical to the ±X-axis line and parallel to the direction of the wind. The wind sail body 3 reaches the least area enduring the power of the wind and received the least effect of the power of the wind.

Referring to FIG. 1C, the wind sail body 3 changes its rotation angle by rotating itself according to the change of revolution angle. Different wind sail body 3 with different revolution angle receives different wind power.

We use the axle center of the main axis 1 as zero point and the connection line from 90 degree to 270 degree of revolution angle as ±Y-axis line, then cut the first driving unit 2 vertically and separate the wind sail body 3 into left and right parts, the right part of the wind sail body 3 receives more wind power than the left part. When the wind sail body 3 receives wind power and starts to revolve circling around the main axis 1, we set the position on the 270 degree of revolution angle as the initial position.

When the wind sail body 3 moves from the position on the 270 degree of revolution angle to the position on the 0 degree. The fixed gear 22 is fixed on the bearing 25 and is fixed, the wind sail body 3 drives the rotation frame 21 starting to whirl and drives the transmitting gear 23 revolve circling around the main axis 1 simultaneously. The transmitting gear 23 gears to the fixed gear 22 and drives the rotary gear 24 rotate oppositely then let the wind sail body 3 rotate. The wind sail body 3 rotates according to the revolution of the main axis 1 and changes its rotation angle gradually.

When the wind sail body 3 comes close to the position of 0 revolution angle, the wind sail body 3 rotates continuously and the area of the sail surface enduring the wind power enlarges to increase the push power on the sail surface from the wind power.

When the wind sail body 3 reaches the position of 0 revolution angle, the surface of the sail is vertical to the wind direction and the surface of the wind sail body 3 opens fully, the wind sail body 3 endures the most power from the wind. When the wind sail body 3 moves from the position on the 0 degree of revolution angle to the position on the 90 degree, the wind sail body 3 rotates according to the revolution of the main axis 1 and changes its rotation angle gradually. The wind sail body 3 rotates continuously and the area of the sail surface enduring the wind power shrinks to decrease the power on the sail surface from the wind.

When the wind sail body 3 passes the position on the 90 degree of revolution angle and is in the left side of the ±Y-axis line, the wind sail body 3 moves from the position on the 90 degree of revolution angle to the position on the 180 degree. The wind sail body 3 rotates according to the revolution around the main axis 1 and changes its rotation angle gradually. The wind sail body 3 rotates continuously and the area of the sail surface enduring the wind power shrinks to decrease the power on the sail surface from the wind.

When the wind sail body 3 reaches the position of 180 revolution angle, the surface of the sail is parallel to the wind direction and the surface of the wind sail body 3 closes totally, the wind sail body 3 endures not any power from the wind. When the wind sail body 3 moves from the position on the 180 degree of revolution angle to the position on the 270 degree, the wind sail body 3 rotates according to the revolution around the main axis 1 and changes its rotation angle gradually. The wind sail body 3 rotates continuously and the area of the sail surface enduring the wind power enlarges to increase the power on the sail surface from the wind.

When the wind sail body 3 passes the position on the 270 degree of revolution angle and is in the right side of the ±Y-axis line, the area of the sail surface enduring the wind power enlarges to increase the power on the sail surface from the wind and push the wind sail body 3 from the beginning again. The planet wind sail mechanism A operates continuously.

Referring to FIG. 1C, the wind sail body 3 in the left side of the axis line of the main axis 1 receives far larger wind power than in the right side. The wind sail body 3 on the position of 180 revolution angle receives not any wind power. The wind sail body 3 only on the position of 0 revolution angle receives the most wind power.

The wind sail body 3 on the position from the 270 revolution angle to the 0 revolution angle and on the position from the 0 revolution angle to the 90 revolution angle receives larger wind power than the wind sail body 3 on the position from the 90 revolution angle to the 180 revolution angle and on the position from the 180 revolution angle to the 270 revolution angle.

Different wind power on the left and right side of the wind sail body 3 makes the wind sail body 3 continues the revolution with the same direction and lead the planet wind sail mechanism A operates continuously. Every time the wind sail body 3 rotates one loop, it revolves round the main axis 1 two loops.

Referring to the FIG. 1A, the planet wind sail mechanism A could change its combination. It could reach the same effect without the bearing 25. Different combination leads different connection and operation of the first driving unit 2, the most different is that the fixed gear 22 is fixed on the main axis 1, and the main axis 1 is fixed, the fixed gear 22 could be made with the main axis 1 in one-piece.

The rotary frame 21 is disposed on the main axis 1 movably and on one side of the fixed gear 22. When the wind sail body 3 revolves around the main axis 1, the wind sail body 3 pushes the rotation frame 21 to whirl around the main axis 1, then let the transmitting gear 23 that gears to the fixed gear 22 drives the rotary gear 24 to rotate oppositely. When the wind sail body 3 revolves around the main axis 1, it also rotates itself.

The connection and operation between the revolution and rotation of the wind sail body 3 around the main axis 1 is the same with the former description.

Figure 2A:
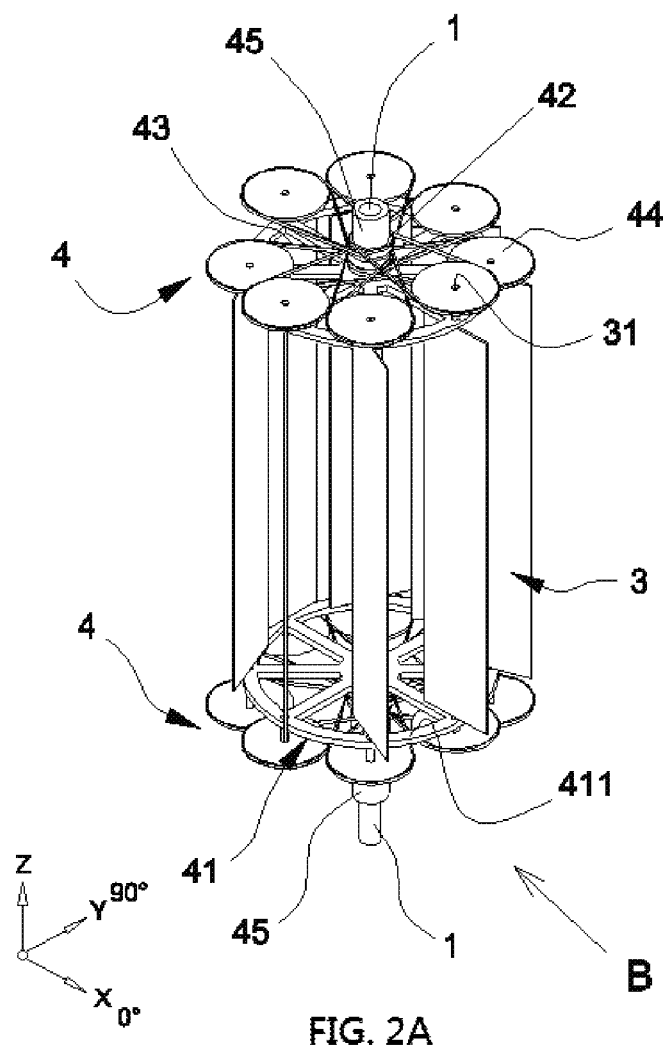
FIG. 2A-B illustrate one embodiment of the present disclosure.

Referring to FIG. 2A, the second embodiment of current disclosure. A planet wind sail mechanism B includes at least one bearing 45, one main axis 1, one second driving unit 4 and one wind sail body 3. The main axis threads the bearing 45 movably. The second driving unit 4 could be plural and disposed on any position of the main axis 1. The second driving unit 4 is disposed on one or both ends of the main axis 1 in the second embodiment.

The second driving unit 4 including at least a rotary frame 41, a fixed roller 42, a belt 43 and a rotary roller 44. The rotation frame 41 is fixed on the main axis 1 and the fixed roller 42 is disposed on one side of the rotation frame 41. The fixed roller 42 is disposed on the bearing 45 fixedly and adjacent to the rotary roller 44. The rotary roller 44 is disposed on side edge 411 of the rotation frame 41. There is a belt 43 disposed between the fixed roller 42 and the rotary roller 44. The belt connects the fixed roller 42 and the rotary roller 44 and transfers the power to each other. The ratio of circumference between the fixed roller 42 and the rotary roller 44 is 1:2.

A rotation axis 31 is disposed on the wind sail body 3 and threads the side edge 411 of the rotation frame 41. The rotation axis 31 is fixed on the axle center of the rotary roller 44 and let the wind sail body 3 whirl with the rotary roller 44 synchronously. The wind sail body 3 could be disposed on the side edge 411 of the rotation frame 41 plurally.

Figure 2B:
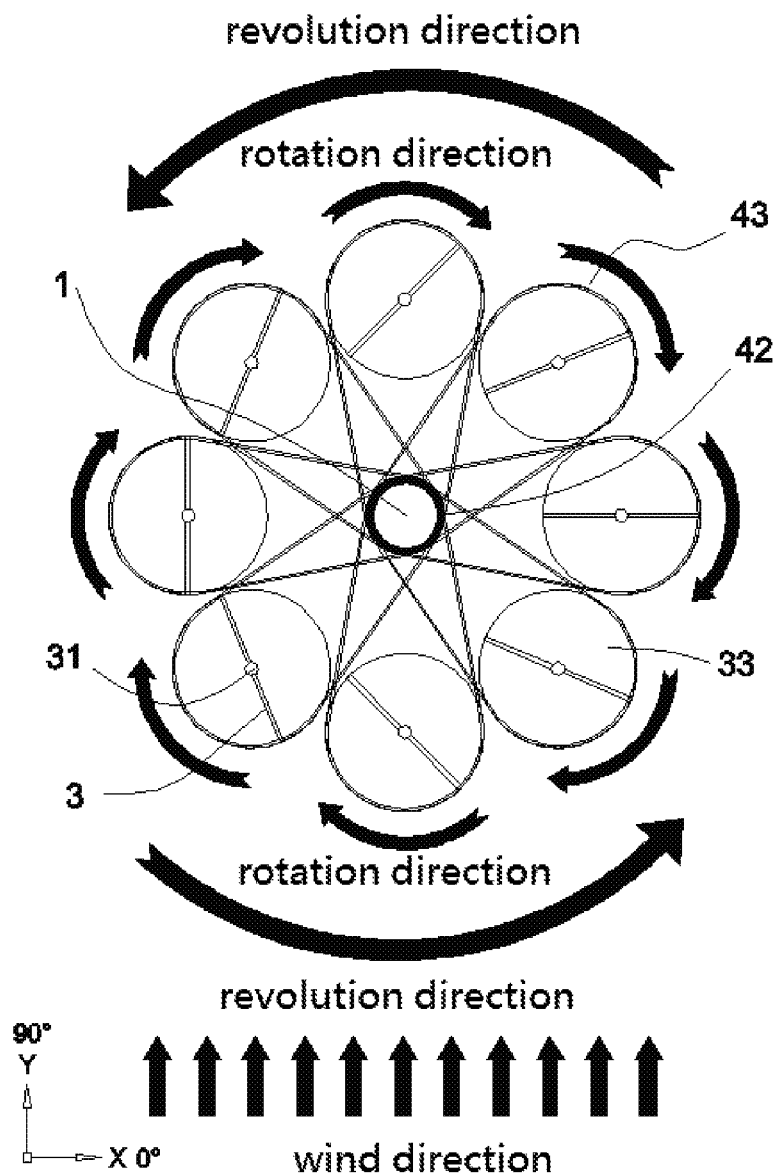

Referring to FIG. 2B, there is different initial rotation angle of different wind sail body 3, the setting of the position and initial angle of each wind sail body 3 is the same with the first embodiment.

When the wind sail body 3 is pushed by the wind and starts to revolve, the wind sail body 3 pushes the rotation frame 41 to whirl synchronously. Then the fixed roller 42 drives the rotary roller 44 by the belt 43 to let the wind sail body 3 rotate with the revolution of the wind sail body 3 on the rotation frame 41. The wind sail body 3 rotates with its revolution around the main axis 1 and changes its rotation angle gradually.

The connection and operation between the revolution and rotation of the wind sail body 3 around the main axis 1 is the same with the first embodiment.

The second embodiment replaces the fixed gear 22, the transmitting gear 23 and the rotary gear 24 of the first embodiment with the fixed roller 42, the belt 43 and the rotary roller 44. The wind sail body 3 works together with the second driving unit 4 in the second embodiment. The wind sail body 3 revolve continuously with the same direction and lead the planet wind sail mechanism B operate continuously, every time the wind sail body 3 rotates one loop, it revolves around the main axis 1 two loops.

Referring to the FIG. 2A, the planet wind sail mechanism B could change its combination and keep the same effect without the bearing 45. Different combination leads different connection and operation of the second driving unit 4. The most different is that the fixed roller 42 is fixed on the main axis 1, and the main axis 1 is fixed. The fixed roller 42 could be made together with the main axis 1 in one-piece. The rotation frame 41 is disposed on the main axis 1 movably and on one side of the fixed roller 42. When the wind sail body 3 is pushed by the wind and revolves around the main axis 1, the wind sail body 3 pushes the rotation frame 41 to whirl around the main axis 1. The belt 43 which is gearing to the fixed roller 42 drives the rotary roller 44 to rotate oppositely and the wind sail body 3 revolves around the main axis 1 with its rotation synchronously. The connection and operation between the revolution and the rotation of wind sail body 3 is the same with the first embodiment.

Figure 3A:
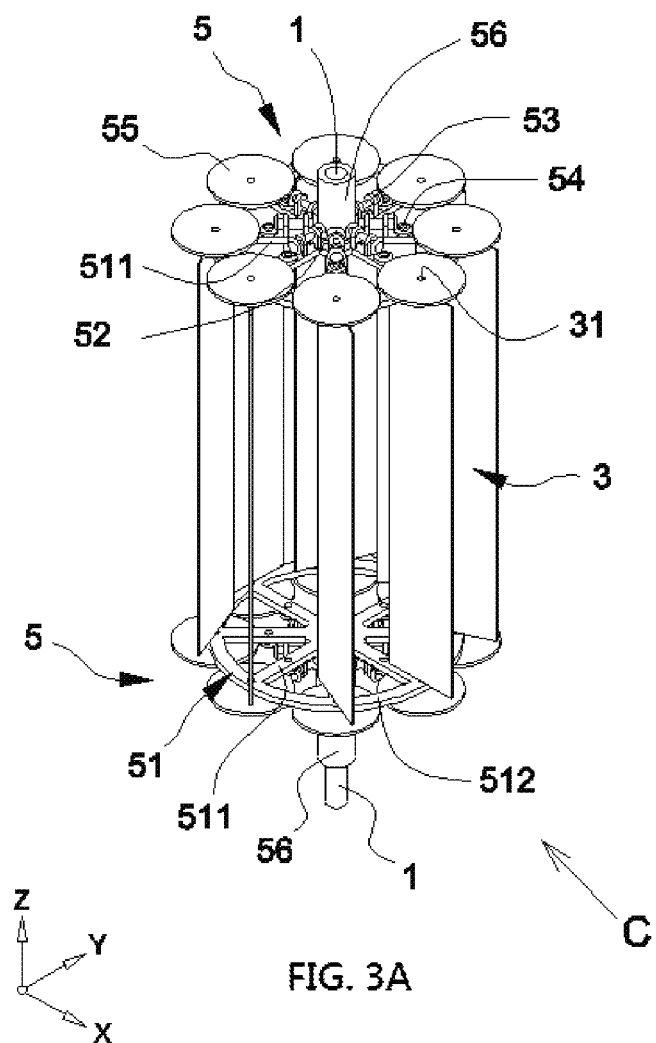
FIG. 3A-B illustrate one embodiment of the present disclosure.

Referring to FIG. 3A, the third embodiment of current disclosure. A planet wind sail mechanism C including at least a bearing 56, a main axis 1, a third driving unit 5 and a wind sail body 3.

The main axis 1 threads the bearing 56 movably. The third driving unit 5 could be plural and disposed on any position of the main axis 1. The third driving unit 5 is disposed on one or both ends of the main axis 1.

Figure 3B:
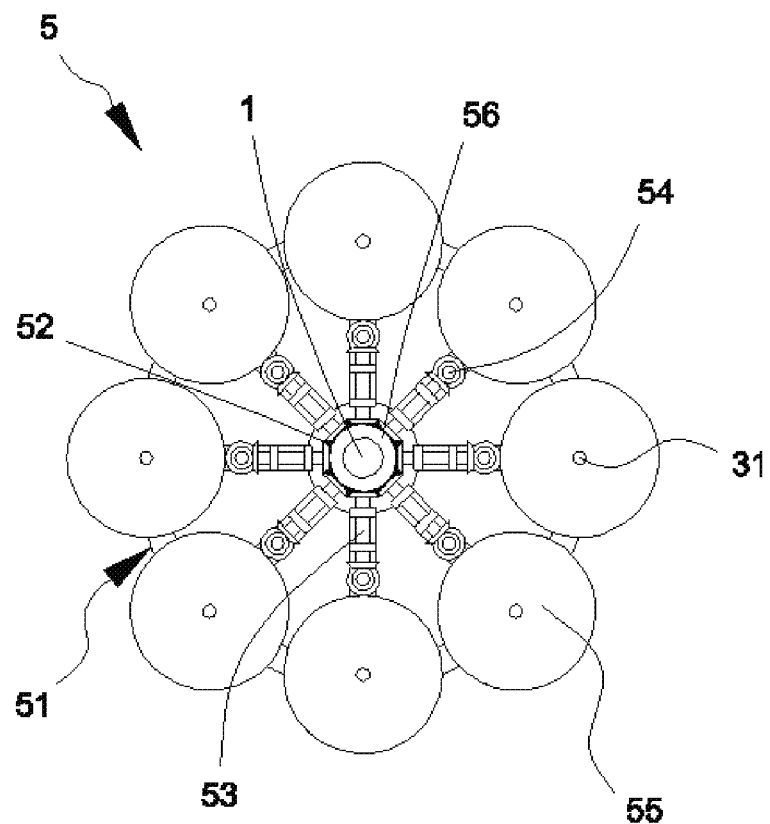

Referring to FIG. 3B, the top view of the third embodiment of this disclosure. The third driving unit 5 including at least a rotation frame 51, a fixed gear 52, a rotary gear 55, a transmitting gear 53, and a transmitting bevel gear 54.

The rotation frame 51 is fixed on the main axis 1. The fixed gear 52 is fixed on the bearing 56 and disposed on one side of the rotation frame 51. The fixed gear 52 could be made together with the bearing 56 in one-piece. The rotary gear 55 is disposed on side edge 512 of the rotation frame 51 movably. The transmitting gear 53 is disposed on ribs 511 of the rotation frame 51 horizontally. There are crown gears disposed on the both ends of the transmitting gear 53, and the crown gear could be replace by spur gear or vortex rod. One end of the transmitting gear 53 gears with the fixed gear 52. The transmitting bevel gear 54 is disposed on the ribs 511 of the rotation frame 51 movably and geared between the transmitting gear 53 and the rotary gear 55. The transmitting bevel gear 54 could be assembled by bevel gear and spur gear.

The ratio of circumference between the fixed gear 52 and the rotary gear 55 is 1:2. The quantity of the transmitting gear 53 and the transmitting bevel gear 54 is odd number.

The rotation axis 31 is disposed on at least one end of the wind sail body 3, the rotation axis 31 threads the side edge 512 of the rotation frame 51 and is fixed on the axle center of the rotary gear 55 to let the wind sail body 3 rotate with the rotary gear 55.

When the wind sail body 3 is pushed and revolves around the main axis 1, the wind sail body 3 leads the rotation frame 51 to whirl synchronously, then the transmitting gear 53 revolves around the main axis 1 synchronously. At this time, the transmitting gear 53 that is geared with the fixed gear 52 whirls and drives the transmitting bevel gear 54 to whirl oppositely. The rotary gear 55 that is geared with the transmitting bevel gear 54 whirls synchronously. The wind sail body 3 rotates according to its revolution around the main axis 1 and changes its rotation angle gradually. The direction of the rotation of the wind sail body 3 is opposite to the direction of the revolution. The transmitting gear 53 and the transmitting bevel gear 54 could transmit the power between the rotary gear 55 and the fixed gear 52. The connection and operation of the revolution and the rotation of the wind sail body 3 is the same with the first embodiment.

The third embodiment replaces the fixed gear 22, the transmitting gear 23 and the rotary gear 24 of the first embodiment with the fixed gear 52, the transmitting gear 53, the transmitting bevel gear 54 and the rotary gear 55. The wind sail body 3 works together with the third driving unit 5 in the third embodiment. The wind sail body 3 revolves continuously with the same direction and leads the planet wind sail mechanism C operate continuously, every time the wind sail body 3 rotates one loop, it revolves around the main axis 1 two loops.

Referring to the FIG. 3A, the planet wind sail mechanism C could change its combination and keep the same effect without the bearing 56. Different combination leads different connection and operation of the third driving unit 5. The most different is that the fixed gear 52 is fixed on the main axis 1, and the main axis 1 is fixed. The fixed gear 52 could be made together with the main axis 1 in one-piece. The rotation frame 51 is disposed on the main axis 1 movably and on one side of the fixed gear 52. When the wind sail body 3 is pushed by the wind and revolves around the main axis 1, the wind sail body 3 pushes the rotation frame 51 to whirl around the main axis 1. The transmitting gear 53 which is gearing to the fixed gear 52 drives the transmitting bevel gear 54 then let the rotary gear 55 to rotate oppositely. The wind sail body 3 revolves around the main axis 1 with its rotation synchronously. The connection and operation between the revolution and the rotation of wind sail body 3 is the same with the first embodiment.

Figures 4A, 4B:
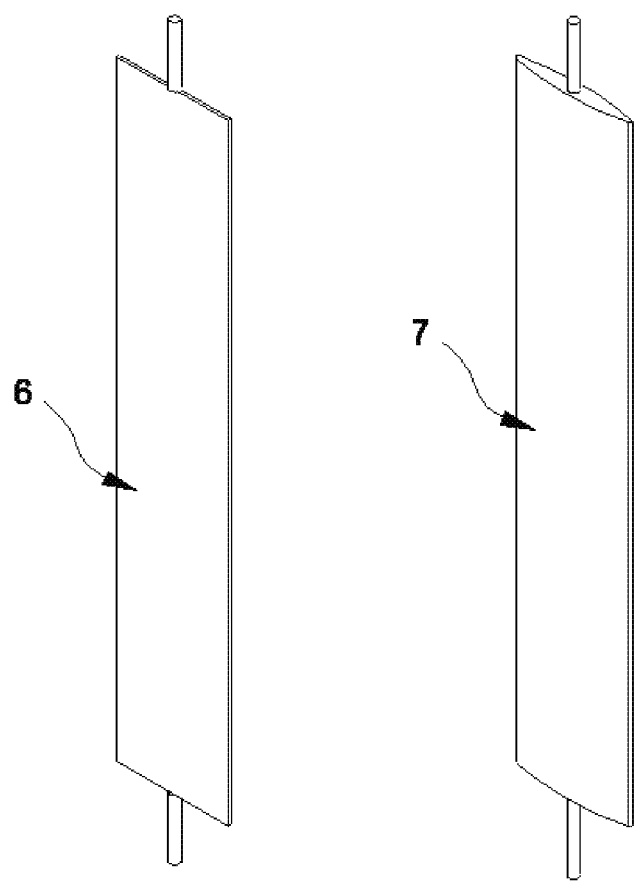
FIG. 4A-B illustrate the used structure of the wind sail body.

Referring to FIG. 4A, it is the used wind sail body. A wind sail body 3 is a used structure of the wind sail body, the sail surface of the wind sail body 6 is a plane structure. Although this structure could endure wind power, but it causes disturbed flow on the side of the wind sail body 6 and decrease the efficiency of the wind power.

Referring to FIG. 4B, it is another used wind sail body, a curved-surface wind sail body 7. The sail surface of the wind sail body 7 is outward curved surface. This structure of outward curved surface could reduce the disturbed flow.

When the planet wind sail mechanism A, B or C utilizes the wind sail body 6 or the wind sail body 7, the wind sail body endures different wind power for different angle between the wind direction. The wind sail body 6 or the wind sail body 7 could not change its shape according to the different angle and could not utilize wind power efficiently. The wind sail body 6 or the wind sail body 7 even would induce the disturbed flow with the changing angle.

For further more utility of this disclosure, we provide two types of wind body structure for the planet wind sail mechanism.

Figure 5A:
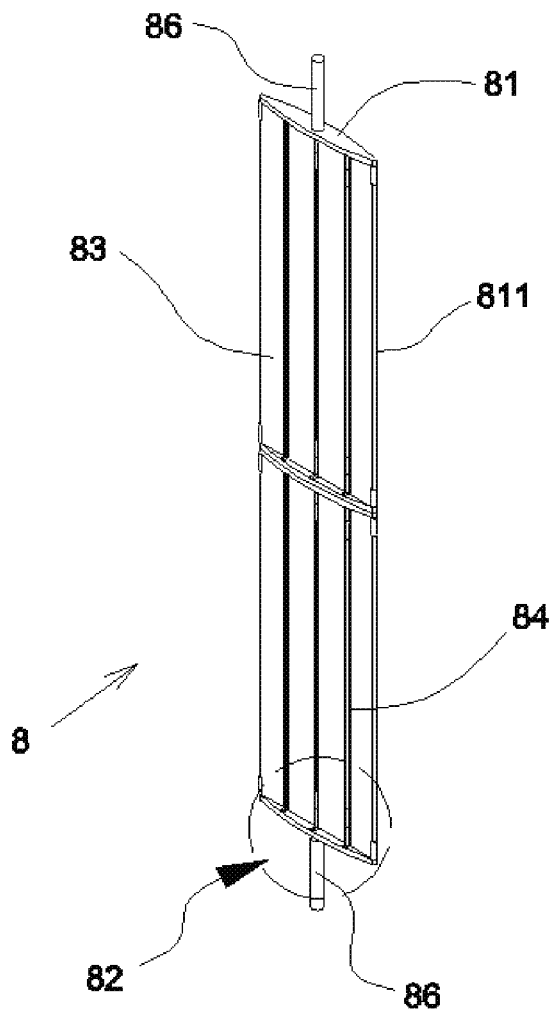
FIG. 5A-D illustrate one embodiment of the present disclosure.

Referring to FIG. 5A, it is a first wind sail body 8 of this disclosure. The first wind sail body 8 including a sail board frame 81, a change basis unit 82, plural sail boards 83, and a telescopic board 84. There is a rotation axis 86 disposed on one or two ends of the first wind sail body 8, the rotation axis 86 could be used in the planet wind sail mechanism A (B or C). There is a change basis unit 82 set on one or two ends of the first wind sail body 8, the change basis unit 82 could be disposed on any position on the axle center line of the first wind sail body 8.

Figure 5B:
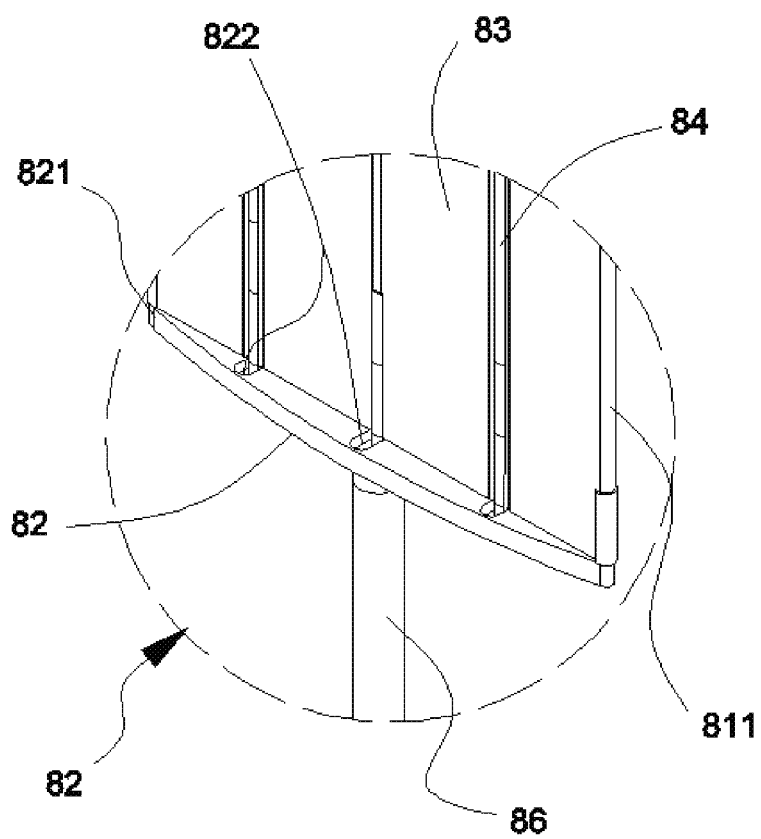
Figure 5C:
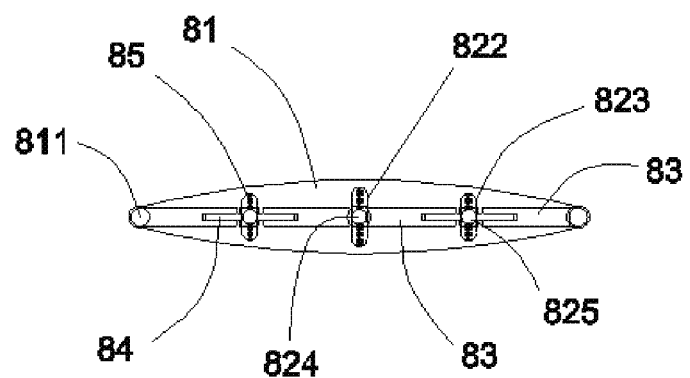

Referring to FIG. 5B and FIG. 5C, they are magnifying sketch and pre-action sketch of the change basis unit 82 of the first wind sail body 8. The change basis unit 82 including at least a first slide rail 822 and a second slide rail 823.

The first slide rail 822 including a movable first swing shaft 824 and an elastic element 85. The elastic element 85 is disposed between the first swing shaft 824 and the first slide rail 822.

The second slide rail 823 includes a movable second swing shaft 825 and an elastic element 85. The elastic element 85 is set between the second swing shaft 825 and the second slide rail 823.

The first swing shaft 824 is connected to at least one sail board 83. The sail board 83 could be stiff or bendable. The second swing shaft 825 is connected to at least a telescopic board 84. The telescopic board 84 could be stiff type or bendable type. Two sides of the telescopic board 84 could plug into one side of the sail board 83. A sail board axial rod 811 of the sail board frame 81 is connected to at least a sail board 83 and another side of the sail board 83 connects to one side of the telescopic board 84.

Figure 5D:
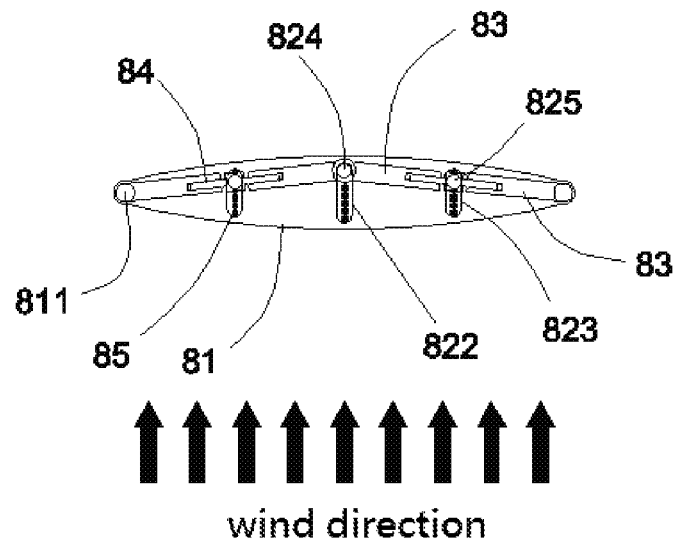

Referring to FIG. 5D, it is the change basis unit after action. When the first wind sail body 8 affected by the wind, the sail board 83 is pushed to close to one side of the sail board frame 81. The sail board 83 leads the first swing shaft 824 and the second swing shaft 825 move in the first slide rail 822 and in the second slide rail 823. The first swing shaft 824 and the second swing shaft 825 compress the elastic element 85 in the first slide rail 822 and in the second slide rail 823. One side of the elastic element 85 is compressed and modified, another side of the elastic element 85 is released and extended. The connection of the swing shaft 824, 825, the elastic element 85 and the telescopic board 84 lead the sail board 83 move according to the wind power and cause the change of the overall surface shape.

The overall sail surface of the first wind sail body 8 changes then let wind power concentrate to improve the overall effect of the planet wind sail mechanism A (B or C).

When the sail surface of the first wind sail body 8 is parallel to the wind direction, the sail surface of the first wind sail body 8 not affected by the wind power, the elastic element 85 push the first swing shaft 824 and the second swing shaft 825 back to the center of the first slide rail 822 and in the second slide rail 823 then return the sail board 83 to the initial state. (as FIG. 5C)

This disclosure provides one more structure of the wind sail body for the planet wind sail mechanism above.

Figure 6A:
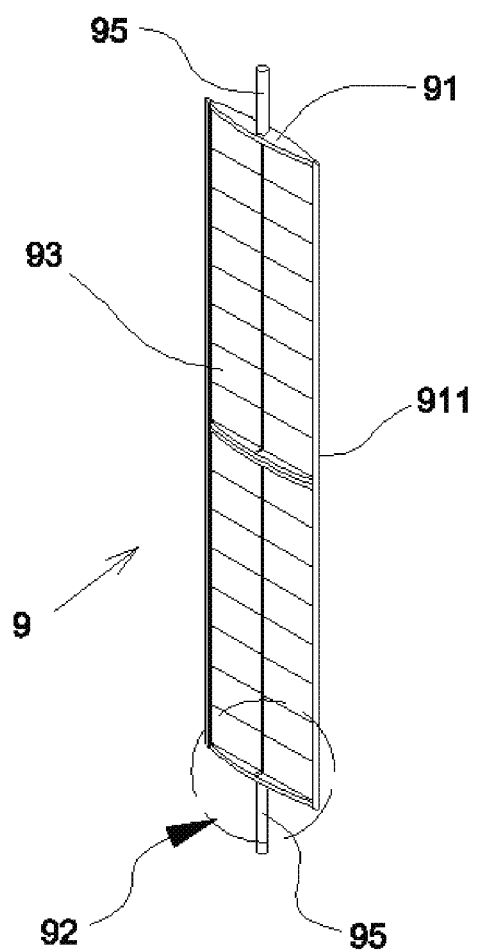
FIG. 6A-D illustrate one embodiment of the present disclosure.
Figure 6B:
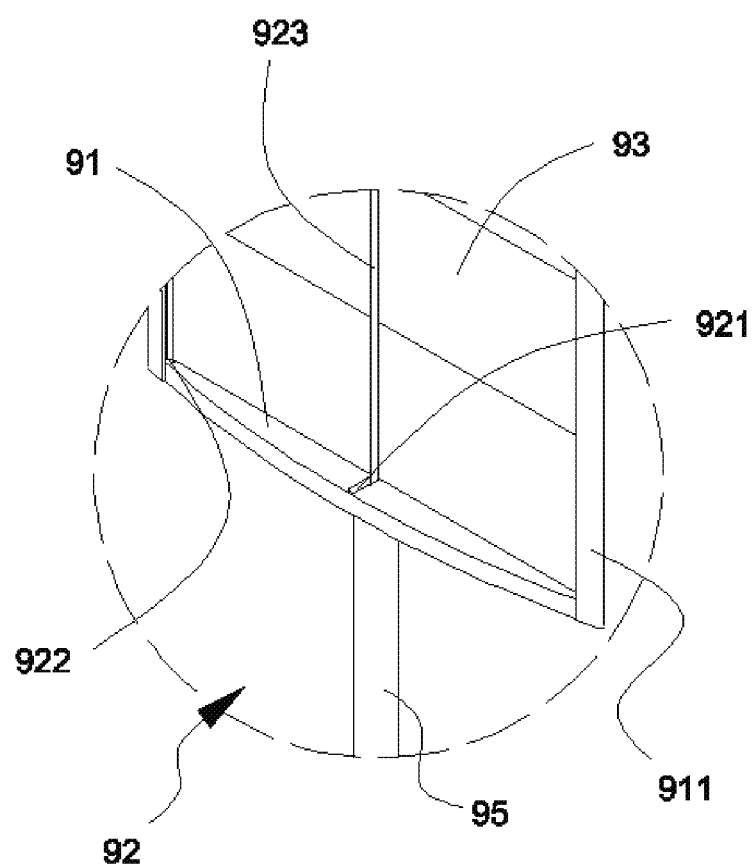
Figure 6C:
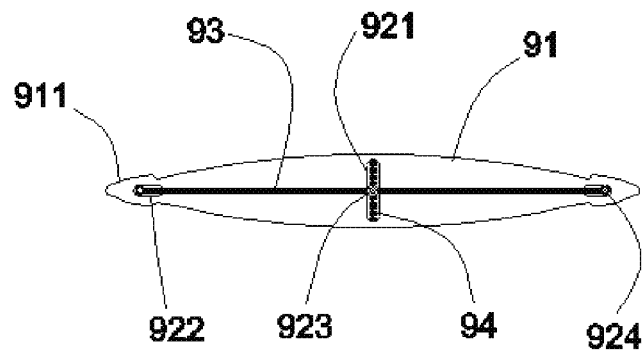

Referring to FIGS. 6A, 6B and 6C, it is a second wind sail body 9. The wind sail body 9 including at least a sail board frame 91, a change basis unit 92, a first swing shaft 923, a second swing shaft 924 and a sail board 93.

A rotation axis 95 is disposed on one or two ends of the second wind sail body 9. A sail board casting 911 is disposed on the both ends of the sail board frame 91. The sail board casting 911 could connect to the side of the sail board 93.

Referring to FIG. 6B, it is the magnifying sketch of the change basis unit of the second wind sail body 9.

The change basis unit 92 could be disposed on the any position of the axis center line of the second wind sail body 9. The change basis unit 92 includes at least a first slide rail 921 and a second slide rail 922.

There is a first swing shaft 923 disposed movably in the first slide rail 921 and the body of the first swing shaft 923 is disposed on the sail board 93.

Referring to FIG. 6C, it is pre-action sketch of the change basis unit of the second wind sail body 9. There is a second swing shaft 924 disposed movably in the second slide rail 922 and the body of the second swing shaft 924 is disposed on the side of the sail board 93. The side of the sail board 93 is contained in the sail board casting 911.

There is at least an elastic element 94 disposed movably in the first slide rail 921, the elastic element 94 is disposed between the body of the first swing shaft 923 and the first slide rail 921.

There is at least an elastic element 94 disposed movably in the second slide rail 922, the elastic element 94 is disposed between the body of the second swing shaft 924 and the second slide rail 922.

Figure 6D:
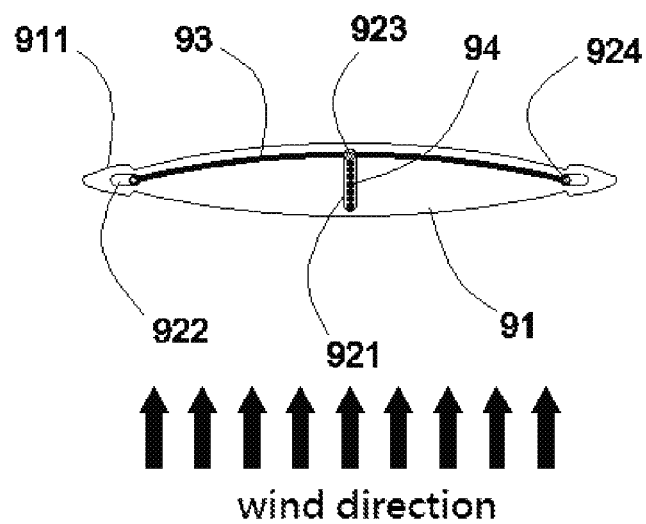
Figure 7:
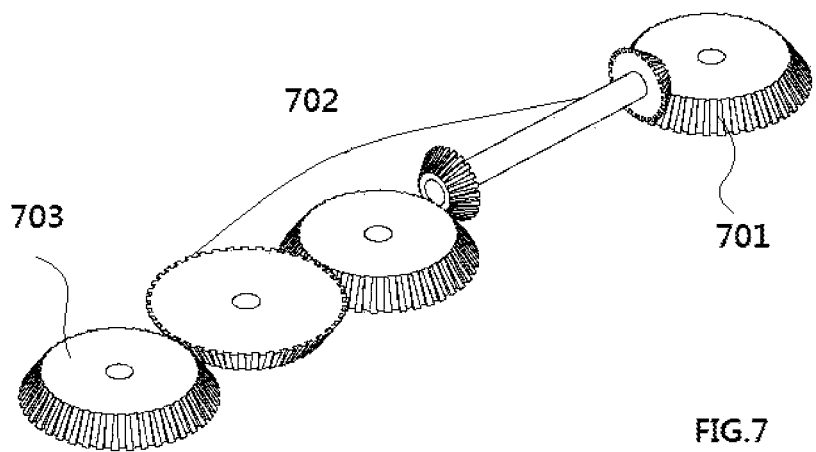
FIG. 7-10 illustrate embodiments of the present disclosure.
Figure 8:
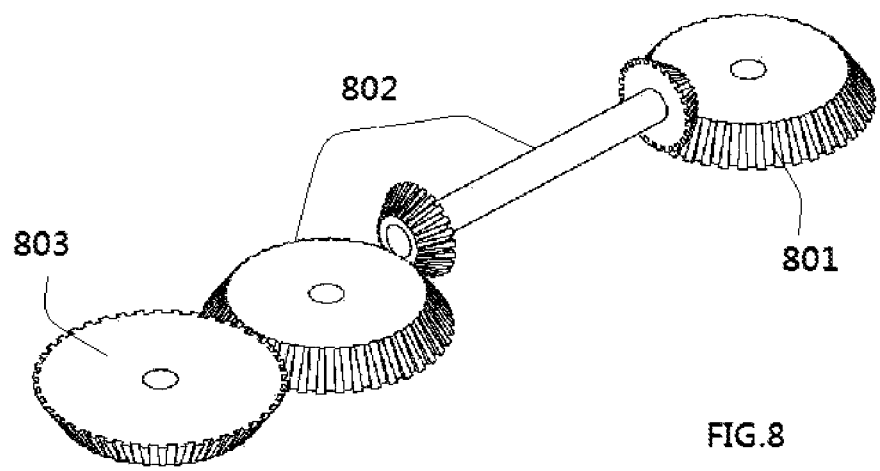
Figure 9:
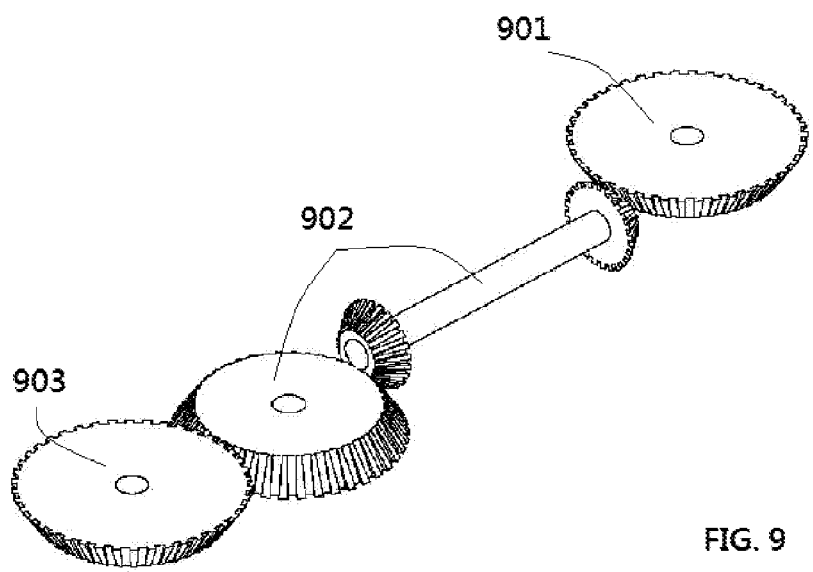
Figure 10:
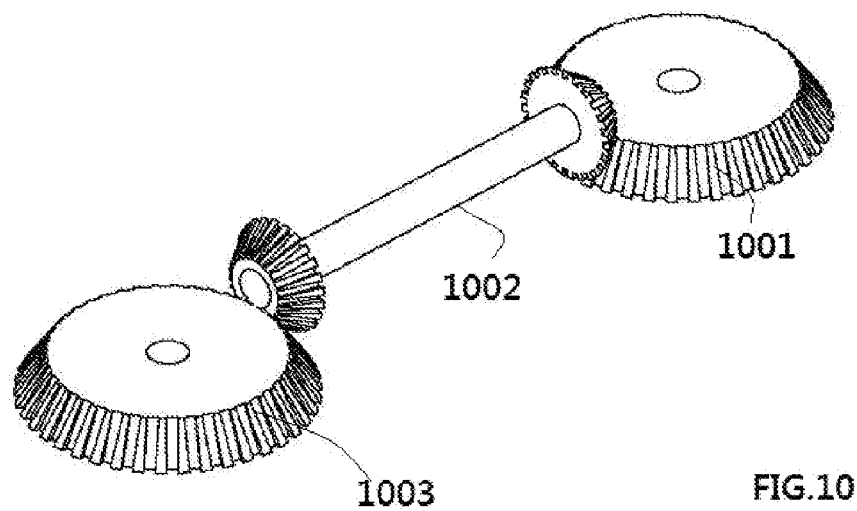

Referring to the FIG. 6D, it is action sketch of the change basis unit of the second wind sail body 9.

When the sail board 93 is pushed by the wind, the sail board 93 moves close to one side of surface of the second wind sail body 9. The sail board 93 leads the first swing shaft 923 to move. The first swing shaft 923 compress the elastic element 94 disposed movably in the first slide rail 921. The other end of the elastic element 94 releases and extends. The sail board 93 leads the second swing shaft 924 to move along the second slide rail 922 to the axis center line of the second wind sail body 9 at the same time then cause the overall surface of the second wind sail body 9 changes to improve the overall effect of the planet wind sail mechanism.

A planet wind sail mechanism includes a main axis, a driving unit, and a wind sail body. The first driving further includes a rotation frame with a plurality of ribs, a transmission gear attached on the rib, a fixed gear which is disposed on the main axis and engaged with the transmission gear and a rotary gear is disposed on the edge of the rotation frame and engaged with the transmission gear.

The wind sail body includes one rotation axis and the rotation axis is disposed on the edge of the rotation frame. Therefore when the wind sail body revolves along the main axis, both the rotary gear and the wind sail body also rotate or spin. Moreover, the fixed gear rotates in an opposite direction with the rotary gear.

FIGS. 7 to 10 show different embodiments of a wind sail mechanism, each embodiment has a transmission gear 702, 802, 902 and 1002. And the transmission gear includes at least one gear. The transmission gear 702, 802, 902 and 1002 is engaged with a fixed gear 701, 801, 901 and 1001 respectively on one end. The transmission gear 702,802, 902 and 1002 is engaged with a rotary gear 703, 803, 903 and 1003 respectively on the other end. When the fixed gear 701, 801, 901 and 1001 spins in one direction and the rotary gear 703, 803, 903 and 1003 spins in opposite direction via the transmission gear 702,802, 902 and 1002. For example, if the fixed gear 701, 801, 901 and 1001 spins clockwise, the rotary gear 703, 803, 903 and 1003 spins counterclockwise, vice versa.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. A planet wind sail mechanism comprising:
   a main axis;
   a driving unit comprising:
      a rotation frame comprising a plurality of ribs;
      a transmission gear attaching on the rib;
      a fixed gear disposed on the main axis and engaged with the transmission gear;
      a rotary gear disposed on the edge of the rotation frame and engaged with the transmission gear; and
   a wind sail body comprising:
      one rotation axis, wherein the rotation axis disposed on the edge of the rotation frame;
      a sail board frame comprising two ends and a sail board axial rod;
      a change basis unit comprising a slide rail wherein the change basis unit attaching on one end of the sail board frame;
      a swing shaft disposed in the slide rail;
      a telescopic board connecting with the swing shaft; and
      a plurality of sail boards, wherein each sail board comprising a first side and a second side, wherein the first side connecting with the sail board axial rod or the swift shaft and the second side connecting to the telescopic board;
   wherein the wind sail body revolving along the main axis driving both the rotary gear and the wind sail body; wherein the fixed gear rotating in an opposite direction with the rotary gear.

2. The mechanism of claim 1, wherein the circumference of the rotary gear is two times greater than the circumference of the fixed gear.

3. The mechanism of claim 1, wherein the fixed gear is selected from one of the following: bevel gear on drive shaft, gear on spin shaft, cylindrical gear, straight gear, spur gear, bevel gear, crown gear, disc gear, gear rack, friction disc wheel, friction disc, universal joints, worm wheel, worm, roller chain, belt, timing belt, toothed belt, notched belt and pulley.

4. The mechanism of claim 1, wherein the rotary gear comprising at least one of the following: fixed gear, bevel gear on drive shaft, gear on spin shaft, cylindrical gear, straight gear, spur gear, bevel gear, crown gear, disc gear, gear rack, friction disc wheel, friction disc, universal joints, worm wheel, worm, roller chain, belt, timing belt, toothed belt, notched belt, and pulley.

5. The mechanism of claim 1, wherein the transmission gear is selected from one of the following fixed gear, bevel gear on drive shaft, gear on spin shaft, cylindrical gear, straight gear, spur gear, bevel gear, crown gear, disc gear, gear rack, friction disc wheel, friction disc, universal joints, worm wheel, worm, roller chain, belt, timing belt, toothed belt, notched belt, and pulley.

6. The mechanism of claim 1, wherein the telescopic board is stiff or bendable.

7. The mechanism of claim 1, where in the sail board is stiff or flexible.

8. A planet wind sail mechanism comprising:
   a main axis;
   a driving unit comprising:
      a rotation frame comprising a plurality of ribs;
      a transmission gear attaching on the rib;
      a fixed gear disposed on the main axis and engaged with the transmission gear;
      a rotary gear disposed on the edge of the rotation frame and engaged with the transmission gear; and
   a wind sail body comprising:
      one rotation axis, wherein the rotation axis disposed on the edge of the rotation frame;
      a sail board frame comprising a sail board casting;
      a change basis unit comprising a slide rail wherein the change basis unit attaching on one end of the sail board frame;
      a swing shaft disposed in the slide rail; and
      a sail board, wherein the sail board comprising a first side and a second side, wherein the first side connecting with the swift shaft and the second side is adapted into the sail board casting;
   wherein the wind sail body revolving along the main axis driving both the rotary gear and the wind sail body; wherein the fixed gear rotating in an opposite direction with the rotary gear.

9. The mechanism of claim 8, where in the sail board is stiff or flexible.

10. The mechanism of claim 8, wherein the circumference of the rotary gear is two times greater than the circumference of the fixed gear.

11. The mechanism of claim 8, wherein the fixed gear is selected from one of the following: bevel gear on drive shaft, gear on spin shaft, cylindrical gear, straight gear, spur gear, bevel gear, crown gear, disc gear, gear rack, friction disc wheel, friction disc, universal joints, worm wheel, worm, roller chain, belt, timing belt, toothed belt, notched belt, and pulley.

12. The mechanism of claim 8, wherein the rotary gear comprising at least one of the following: fixed gear, bevel gear on drive shaft, gear on spin shaft, cylindrical gear, straight gear, spur gear, bevel gear, crown gear, disc gear, gear rack, friction disc wheel, friction disc, universal joints, worm wheel, worm, roller chain, belt, timing belt, toothed belt, notched belt, and pulley.

13. The mechanism of claim 8, wherein the transmission gear is selected from one of the following fixed gear, bevel gear on drive shaft, gear on spin shaft, cylindrical gear, straight gear, spur gear, bevel gear, crown gear, disc gear, gear rack, friction disc wheel, friction disc, universal joints, worm wheel, worm, roller chain, belt, timing belt, toothed belt, notched belt, and pulley.

* * * * *